July 22, 1952 G. E. TRIPP 2,604,244
APPARATUS FOR APPLYING AN OVERWRAP
Filed Jan. 30, 1948
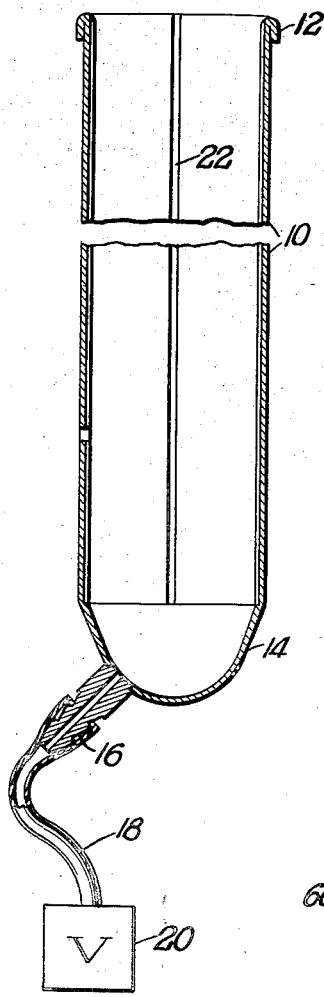
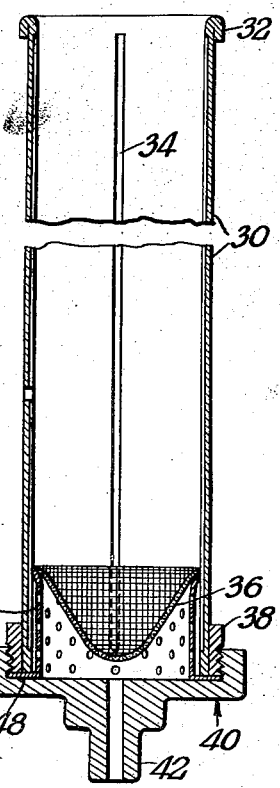
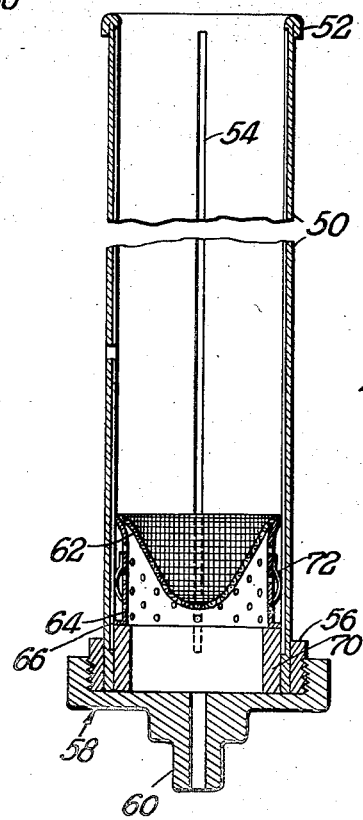
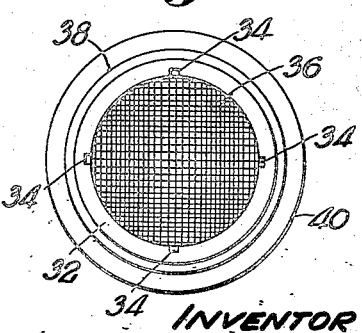
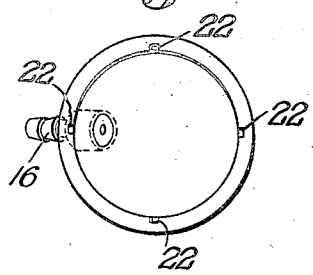
INVENTOR
GEORGE E. TRIPP
BY Harry H. Levin
ATTORNEY Patented July 22, 1952

2,604,244

UNITED STATES PATENT OFFICE 2,604,244

APPARATUS FOR APPLYING AN OVERWRAP

George E. Tripp, Chicago, Ill., assignor to The Visking Corporation, Chicago, Ill., a corporation of Virginia Application January 30, 1948, Serial No. 5,471

6 Claims. (Cl. 226—2)

This invention relates to packaging, more particularly, it relates to an apparatus for applying an overwrap to liver sausage.

In one of the common procedures for making liver sausage, the liver emulsion is stuffed into a casing and thereafter the stuffed casing subjected to the well-known processing operations. An opaque fibrous casing of the type and nature disclosed in United States Patent 2,045,349 has been used for liver sausage and it has given admirable results. Such a casing, however, is not moisture-proof with the consequence that during storage the sausage loses moisture. Due to the moisture loss, brown rings develop on the sausage in about five days.

Many attempts have been made to eliminate the moisture loss or reduce it to a minimum. During the course of research it was found that if the liver sausage were overwrapped in a polyethylene tubing, the moisture loss would be reduced to such an extent that the brown rings would not develop for a period of at least three weeks.

Recently there has been devised a process for the production of seamless polyethylene tubing in a flattened, collapsed condition. In order to use such a tubing for an overwrap for liver sausage it is necessary to open up the tubing so that the sausage can be stuffed therein.

An object of this invention is to provide a new and improved apparatus for applying an overwrap.

Another object of this invention is to provide an apparatus for applying an overwrap comprising means permitting uniform application of vacuum to open up and distend the tubing constituting the overwrap.

An additional object of this invention is to provide an apparatus for applying an overwrap comprising means permitting the quick release of the vacuum between the tubing constituting the overwrap and the stuffer without interrupting the vacuum producing mechanism.

Other and additional objects will become apparent hereinafter.

The objects of the invention are accomplished in general by providing a cylindrical stuffer tube having a bottom closure provided with means for connection to a vacuum producing means. The stuffer tube is of a diameter slightly larger than the diameter of the liver sausage to be overwrapped and is provided for reasons which will be explained more fully hereinafter, on its interior surface with at least one groove extending substantially the length of the tube.

In one embodiment of the invention, the bottom closure is hemispherical and provided with a nozzle whereby it is connected to the vacuum producing means. In another embodiment, the bottom closure is in the form of a nipple adapted to be connected to the vacuum producing means. When the nipple is utilized, a screen having a concave surface substantially conforming to the lower end of the sausage and constituting a support for the sausage is disposed and secured in the stuffer tube adjacent the bottom thereof and in spaced relationship to the nipple. Means are also provided for adjusting the position of the screen in the stuffer tube so that sausages of variable lengths can be accommodated. For reasons which will become apparent, the open end of the stuffer tube is provided with a lip.

In practice a flattened, seamless polyethylene tubing of a diameter slightly less than the diameter of the liver sausage to be overwrapped therein is tied at one end. The tied end is then inserted into the stuffer tube which is of a diameter slightly greater than the diameter of the liver sausage, and the open end of the tubing flared open by hand is cuffed or turned back on the bead at the open end of the stuffer tube. Since the stuffer tube is connected to the vacuum producing means as soon as the open end of the tubing is turned over on the bead of the stuffer tube, the air between the exterior surface of the polyethylene tubing and the inside of the stuffer tube is withdrawn by the vacuum and the polyethylene tubing is expanded and caused to contact with the inner surface of the stuffer tube. A finished liver sausage is inserted into the expanded polyethylene tubing and thereafter the cuffed portion of the tubing is removed from the stuffer tube whereby the vacuum in the tube is released. Upon the release of the vacuum, the polyethylene tubing shrinks or contracts into intimate contact with the sausage and the latter with both casings is withdrawn from the stuffer tube. The open end of the polyethylene tubing is tied either prior or subsequent the removal of the overwrapped sausage from the stuffer tube.

The invention will be more clearly understood by reference to the following detailed description when taken in connection with the accompanying drawings, wherein—

Figure 1 is an elevation of one embodiment of the invention showing the stuffer tube, broken and partly in section, and the vacuum producing means diagrammatically.

Figure 2 is a top plan view of the stuffer tube shown in Figure 1.

Figure 3 is a broken longitudinal section of a modified stuffer tube containing a screen.

Figure 4 is a top plan view of the stuffer tube shown in Figure 3.

Figure 5 is a broken longitudinal section of a second modified stuffer tube having an adjustable screen.

Referring now to the drawings wherein like reference numerals designate like parts, the reference numeral 10 designates a tube which constitutes the stuffer tube and is provided with a rolled over edge constituting a lip 12 at the top thereof. In the form shown in Figure 1 the stuffer tube 10 is provided at the bottom thereof with a closure 14 substantially conforming to the shape of the end of a liver sausage. The closure 14 is provided on the side thereof with a nozzle 16, which by means of a hose or pipe 18 is connected to a well known vacuum producing means such as a pump diagrammatically shown and generally indicated by the reference numeral 20. The tube 10 in the form shown in Figure 1 is provided with four equidistantly spaced grooves 22 on the interior thereof. Each of the grooves 22 extends throughout substantially the entire length of the stuffer tube 10.

The closure at the bottom of the tube need not be of the curved shape previously described. If desired, the closure may present a flat surface to the interior of the stuffer tube. When a flat bottom closure is used, it may be obtained by using a nipple designed to be connected to a vacuum producing means. When a nipple is used, a screen having a concave surface substantially conforming to the shape of the end of the liver sausage is preferably used. The screen which constitutes a support for the sausage is appropriately secured in position in the tube above the nipple, and serves to maintain the end of the tubing and end of the sausage spaced from the nipple.

Referring now to Figures 3 and 4 wherein the embodiment described in the preceding paragraph is shown, the reference numeral 30 designates the stuffer tube which is formed with a rolled over edge 32 at the top thereof and four equidistantly spaced grooves 34 in the interior wall thereof. Though each of the grooves 34 may extend substantially throughout the length of the tube 30, in the form shown the respective termini of each groove are in spaced relationship to the top of the stuffer tube and the bottom of a screen 36 hereafter more fully described. Preferably, the top terminus of each groove 34 is opposite the bottom of the lip 32 and the bottom terminus slightly above the bottom of the screen 36.

An exteriorly threaded band 38 is appropriately secured on the outer wall of the stuffer tube 30 adjacent the lower end thereof and a nipple 40 is screwed thereon. The nipple 40 constitutes a bottom closure and the reduced portion 42 thereof constitutes a nozzle. It is to be noted that the nipple 40 presents a flat surface to the interior of the stuffer tube. The nozzle 42 is connected by means of a line (not shown) to a vacuum producing means, such as a pump (not shown), the line and vacuum producing means being respectively similar to the pipe or hose 18 and the vacuum producing means 20 of Figure 1.

The screen 36 has a concave surface that conforms substantially to the end of the liver sausage. The upper peripheral edge of screen 36 is formed integrally with a perforated cylinder 46 which constitutes means for supporting the screen 36. The cylinder 46 is in spaced relationship to the interior wall of the tube 30 and at the bottom thereof is formed with an annular flange 48 which is adapted to be positioned between the nipple 40 and the bottom edges of the tube 30 and annular ring 38. It is apparent that when the nipple 40 is secured in position the annular flange 48, and hence the screen, will be removably secured in position.

In accordance with the invention the screen 36 can be adjustably disposed in the stuffer tube so that it can be positioned at various depths depending on the length of the article to be wrapped. Referring now to Figure 5 wherein an embodiment having an adjustable screen is shown it will be noted that the stuffer tube 50, lip 52, grooves 54, bottom band 56, nipple 58, reduced portion or nozzle 60, screen 62, cylinder 64 and flange 66 are respectively similar to the corresponding elements of the embodiment shown in Figure 3, except that the flange 66 is of a size so that it will fit snugly and yet be slidable in the tube 50, as well as being seated on the flat surface of the bottom closure 58 or on a spacer ring 70, the height of which depends on the desired location of the screen 62 in the tube. Optionally, instead of using one ring 70 a plurality thereof arranged in superimposed relationship can be used. In order to secure the screen in position the cylinder 64 is provided with a spring or plurality of spring members 72 which are designed to engage the inner wall of the stuffer tube.

To use the apparatus for overwrapping liver sausage with a polyethylene tubing, the vacuum producing means is turned on and a polyethylene tubing having one end thereof tied is introduced into the stuffer tube with the tied end leading. The other end of the polyethylene tubing after being flared open by the operator is cuffed and turned back over the lip at the top of the stuffer tube whereby the tubing is anchored. When the upper end of the polyethylene tubing has been turned over on the lip, the vacuum mechanism will exhaust the air between the tube and tubing whereby the tubing will be opened up throughout its length. Since the polyethylene tubing is of a diameter slightly less than the diameter of the sausage, the vacuum will distend or stretch the polyethylene tubing until it is in intimate contact with the interior wall of the stuffer tube. A previously prepared liver sausage having an opaque fibrous casing is stuffed into the polyethylene tubing in the stuffer tube. Due to the fact that the distended tubing is of a diameter slightly greater than that of the sausage, the latter will easily slide into position until the leading end thereof engages the tied end of the polyethylene tubing in the stuffer tube. The position of the tied end of the polyethylene tubing depends on the length of the tubing and the position of the screen, if used. In an apparatus of the type shown in Figure 1, the tied end of the polyethylene tubing is preferably disposed on the hemispherical closure. In the forms shown in Figures 3 and 5, the tied end of the polyethylene tubing is preferably disposed on the screen. After the liver sausage has been inserted in the expanded polyethylene tubing, and without interrupting the operation of the vacuum applying means, the portion of the tubing which has been previously rolled over onto the lip is unrolled or otherwise removed therefrom. As soon as any of the upper ends of the grooves are uncovered and exposed to the atmosphere, the vacuum, even though the mechanism for applying the same has not been interrupted, will be released with the result that the polyethylene tubing will shrink or contract and since it is originally of a slightly smaller diameter than the diameter of the sausage, it will intimately conform to the liver sausage and form a tightly adhering casing. The open end of the polyethylene tubing is tied either before or after removal of the overwrapped sausage from the stuffer tube.

To eliminate entrapped air or any air pockets which may form during the stuffing of the sausage in the tubing, the latter is provided with a drilled hole one-eighth inch in diameter about two inches from the end of the tubing first tied, the tie being made below said hole.

The stuffer tube is generally made of a length to accommodate the length of the liver sausage to be overwrapped. If desired, a different stuffer tube of the form shown in Figures 1 and 3 can be had for each different length of liver sausage. Alternatively, the embodiment shown in Figure 5 can be utilized with liver sausage of different lengths, the screen being adjusted to proper position by the use of one or more of the spacing rings as dictated by the length of the sausage.

The diameter of the stuffer tube is slightly greater than the diameter of the liver sausage to be overwrapped. In general, the diameter of the stuffer tube is such that when a polyethylene tubing has been opened up and extended therein a liver sausage will freely slide thereinto.

The stuffer tube can be made of any material capable of withstanding reduced pressures. Preferably, the stuffer tube is made of a metal such as stainless or polished steel.

The grooves in the inner wall of the stuffer tube are important features of the invention. It has been found that when the grooves were omitted the vacuum would not, in many instances, be uniformly applied to the exterior surface of the polyethylene tube introduced into the stuffer tube. Frequently, a seal or seals were made between the polyethylene tubing and the inner wall of the stuffer tube with the result that the polyethylene tube was not opened up and distended. By the use of the grooves the formation of seals between the polyethylene tubing and the stuffer tube is eliminated with the consequence that the polyethylene tube in every case is uniformly subjected to the vacuum in the tube.

The grooves also serve another important function. Due to the grooves the vacuum, without interruption of the operation of the vacuum producing means, is released immediately when the cuffed portion of the polyethylene tube uncovers a groove. In other words, the grooves facilitate and make possible a rapid release of the vacuum in the stuffer tube without shutting off the vacuum producing mechanism. If the grooves were omitted, it would be necessary to shut off the vacuum producing means in order to break the vacuum.

Although in the specific embodiments of the invention the stuffer tube is described as being provided with four equidistantly spaced grooves, the invention is not restricted thereto. Any number of grooves can be used. Satisfactory results have been obtained with a stuffer having one, two, three, five or more grooves. When a plurality of grooves are utilized, it is preferable that they be equidistantly spaced. The size of the grooves is not critical. Grooves of approximately one-sixteenth inch width and one thirty-second inch depth have given satisfactory results. Though grooves are preferred, they may be replaced by longitudinal ribs one-sixteenth inch wide and one thirty-second inch deep. The apparatus of this invention can be appropriately mounted on a suitable support, with or without a casing. If desired, a plurality of the stuffer tubes and the appurtenant mechanisms can be encased in an appropriate housing.

Though the invention has been described in connection with the overwrapping of liver sausage in polyethylene tubing, it is to be understood that the invention is not restricted thereto. The invention can be used for opening up any container having one end thereof closed and supplied in a collapsed or flattened condition and the packaging of any article therein. It is admirably suited for use with containers or casings formed of materials having at least some elasticity whereby they can be distended and thereafter permitted to contract to form an intimate cover or casing conforming to the shape of the wrapped article.

The invention provides a simple, efficient apparatus for applying a tubular casing to various articles of a cylindrical shape. Due to the construction of the stuffer tube, and particularly the grooves therein, the application of the vacuum need not be interrupted between the overwrapping of different articles, with the result that a relatively high output per unit can be obtained.

Since it is obvious that various changes and modifications can be made in the above description without departing from the nature or spirit thereof, this invention is not restricted thereto except as set forth in the appended claims.

I claim:

1. An apparatus for applying a tubular wrap which comprises a cylindrical tube in which a flattened tubing closed at one end and constituting the wrap is to be inserted with the closed end leading and the open end turned back on one end of said tube, said tube being of a diameter slightly greater than the diameter of the article to be wrapped and having at least one groove in its inner wall extending substantially the length thereof, a lip adjacent the edge of the tube over which the tubing is turned back to anchor said tubing, a closure on the other end of said tube, a nozzle carried by said closure, a supporting screen conforming to the shape of the leading end of the article to be wrapped, means to secure said screen in said tube in spaced relationship to said closure, and vacuum producing means connected to said nozzle.

2. An apparatus for applying a tubular wrap which comprises a cylindrical tube in which a flattened tubing closed at one end and constituting the wrap is to be inserted with the closed end leading and the open end turned back on one end of said tube, said tube being of a diameter slightly greater than the diameter of the article to be wrapped and having at least one groove in its inner wall extending substantially the length thereof, a lip adjacent the edge of the tube over which the tubing is turned back to anchor said tubing, a closure on the other end of said tube, a nozzle carried by said closure, a supporting screen conforming to the shape of the leading end of the article to be wrapped, a foraminous cylinder having its upper edge integrally secured to the top edge of said screen, means to secure said cylinder in said tube whereby said screen is disposed in spaced relationship to said closure, and vacuum producing means connected to said nozzle.

3. An apparatus for applying a tubular wrap which comprises a cylindrical tube in which a flattened tubing closed at one end and constituting the wrap is to be inserted with the closed end leading and the open end turned back on one end of said tube, said tube being of a diameter slightly greater than the diameter of the article to be wrapped and having at least one groove in its inner wall extending substantially the length thereof, a lip adjacent the edge of the tube over which the tubing is turned back to anchor said tubing, a closure on the other end of said tube, a nozzle carried by said closure, a supporting screen in said tube conforming to the shape of the leading end of the article to be wrapped, a foraminous cylinder having its upper edge integrally secured to the top edge of said screen, a flange on the lower edge of said cylinder, said flange being disposed between the bottom of said tube and said closure, and vacuum producing means connected to said nozzle.

4. An apparatus for applying a tubular wrap which comprises a cylindrical tube in which a flattened tubing closed at one end and constituting the wrap is to be inserted with the closed end leading and to open end turned back on one end of said tube, said tube being of a diameter slightly greater than the diameter of the article to be wrapped and having at least one groove in its inner wall extending substantially the length thereof, a lip adjacent the edge of the tube over which the tubing is turned back to anchor said tubing, a closure on the other end of said tube, a nozzle carried by said closure, a supporting screen in said tube and conforming to the shape of the leading end of the article to be wrapped, a foraminous cylinder having its upper edge integrally secured to the top edge of said screen, spring members carried by said cylinder and adapted to engage the inner wall of said tube and thereby secure said cylinder in said tube, and vacuum producing means connected to said nozzle.

5. An apparatus for applying a tubular wrap which comprises a cylindrical tube in which a flattened tubing closed at one end and constituting the wrap is to be inserted with the closed end leading and the open end turned back on one end of said tube, said tube being of a diameter slightly greater than the diameter of the article to be wrapped and having at least one groove in its inner surface extending substantially the length thereof, a closure on the other end of said tube, a nozzle carried by said closure, a screen to support the leading end of the article to be wrapped, means to position said screen in spaced relationship to said closure and vacuum producing means connected to said nozzle.

6. An apparatus for applying a tubular wrap which comprises a cylindrical tube in which a flattened tubing closed at one end and constituting the wrap is to be inserted with the closed end leading and the open end turned back on one end of said tube, said tube being of a diameter slightly greater than the dimension of the article to be wrapped and having at least one groove in its inner wall extending substantially the length thereof, a lip adjacent the edge of the tube over which the tubing is turned back to anchor said tubing, a closure on the other end of said tube, a nozzle carried by said closure, a screen to support the leading end of the article to be wrapped, means to position said screen in said tube in spaced relationship to said closure, and vacuum producing means connected to said nozzle.

GEORGE E. TRIPP.

REFERENCES CITED

The following references are of record in the file of this patent:

UNITED STATES PATENTS

| Number | Name | Date |
| --- | --- | --- |
| 2,348,176 | Gott et al. | May 2, 1944 |
| 2,418,142 | Socke | Apr. 1, 1947 |

FOREIGN PATENTS

| Number | Country | Date |
| --- | --- | --- |
| 112,960 | Australia | Apr. 18, 1941 |